(12) United States Patent
Rosen et al.

(10) Patent No.: US 11,716,692 B1
(45) Date of Patent: Aug. 1, 2023

(54) PROXIMITY BASED UPLINK POWER CONTROL

(71) Applicant: T-Mobile Innovations LLC, Overland Park, KS (US)

(72) Inventors: David Rosen, Washington, DC (US); Akin Ozolu, McLean, VA (US); Nagi A. Mansour, Arlington, VA (US); Daniel Stewart Broyles, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 81 days.

(21) Appl. No.: 17/376,691

(22) Filed: Jul. 15, 2021

(51) Int. Cl.
    *H04W 52/14*     (2009.01)
    *H04W 52/28*     (2009.01)

(52) U.S. Cl.
    CPC .................. *H04W 52/146* (2013.01)

(58) Field of Classification Search
    CPC . H04W 52/146; H04W 52/04; H04W 52/283; H04W 52/288
    See application file for complete search history.

(56) References Cited

U.S. PATENT DOCUMENTS

| | | | |
|---|---|---|---|
| 2013/0115900 A1* | 5/2013 | Zhu | H04W 52/04 455/115.1 |
| 2015/0009913 A1* | 1/2015 | Lee | H04W 52/146 370/329 |

FOREIGN PATENT DOCUMENTS

WO    WO-2018093928 A1 *   5/2018      H04B 1/0057

* cited by examiner

*Primary Examiner* — John J Lee
(74) *Attorney, Agent, or Firm* — Shook, Hardy & Bacon L.L.P.

(57) ABSTRACT

Systems and methods are provided for dynamically allocating total uplink power for a wireless communication device (WCD). A distance between a portion of a user's body (e.g., the user's ear) and the WCD is determined. It is then determined whether this distance is less than or greater than a predetermined threshold. If the distance is less than the predetermined threshold, the WCD may use a lower uplink power. If the distance is greater than the predetermined threshold, the WCD may use a higher uplink power. The WCD then transmits wireless uplink signals using either the lower or higher uplink power based on the distance between the WCD and a portion of the user's body.

16 Claims, 5 Drawing Sheets ically as shown in and/or described in connection with at least one of the figures, and as set forth more completely in the claims.

PROXIMITY BASED UPLINK POWER CONTROL

SUMMARY

The present disclosure is directed, in part, to uplink power control of a user device in a wireless communication network, substantially as shown in and/or described in connection with at least one of the figures, and as set forth more completely in the claims.

According to various aspects of the technology, uplink power with respect to multiple uplink channels used by a user device to communicate with one or more access points of a wireless communications network is dynamically adjusted in order to improve the abilities of the user device. Typically, maximum total uplink power is hard-set for a user device and is equally divided among the one or more transmitters of the user device, which are used to communicate with one or more wireless networks using one or more uplink channels. Further, in some devices, which are configured for E-UTRAN New Radio Dual Connectivity (ENDC), the maximum total uplink power may be different, depending on whether or not ENDC is configured or deconfigured. For example, the maximum total uplink power may be set to 23 dBm if ENDC is configured and may only permit the maximum total uplink power to be increased to 26 dBm if ENDC is deconfigured. Dynamically switching between 23 dBm and 26 dBm is dependent upon the use of a wireless communication device. For example, 23 dBm may be utilized if the user is using voice while 26 dBm is more beneficial for high speed data usage. Uplink channel grants and maximum total transmit power of the user device are determined.

In aspects herein, a distance between a portion of a user's body (e.g., the user's ear) and the wireless communication device (WCD) is determined, such as by a sensor coupled to a user device. In some aspects, it may be determined that the distance is less than a predetermined threshold. If the distance is less than a predetermined threshold, a wireless uplink signal transmitted by the user device may be transmitted at a lower transmit power than what was previously transmitted. A lower transmit power is used in this scenario as the user device is likely on or near the user's body (e.g., the user's ear). If the distance is greater than a predetermined threshold, a wireless uplink signal transmitted by the user device is transmitted at a higher transmit power than what would be transmitted if the distance were smaller. This is because a great distance indicates that the user device may be farther away from the user's body, such as if the user is using speaker phone.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Aspects of the present disclosure are described in detail herein with reference to the attached figures, which are intended to be exemplary and non-limiting, wherein.

DETAILED DESCRIPTION

Figure 1:
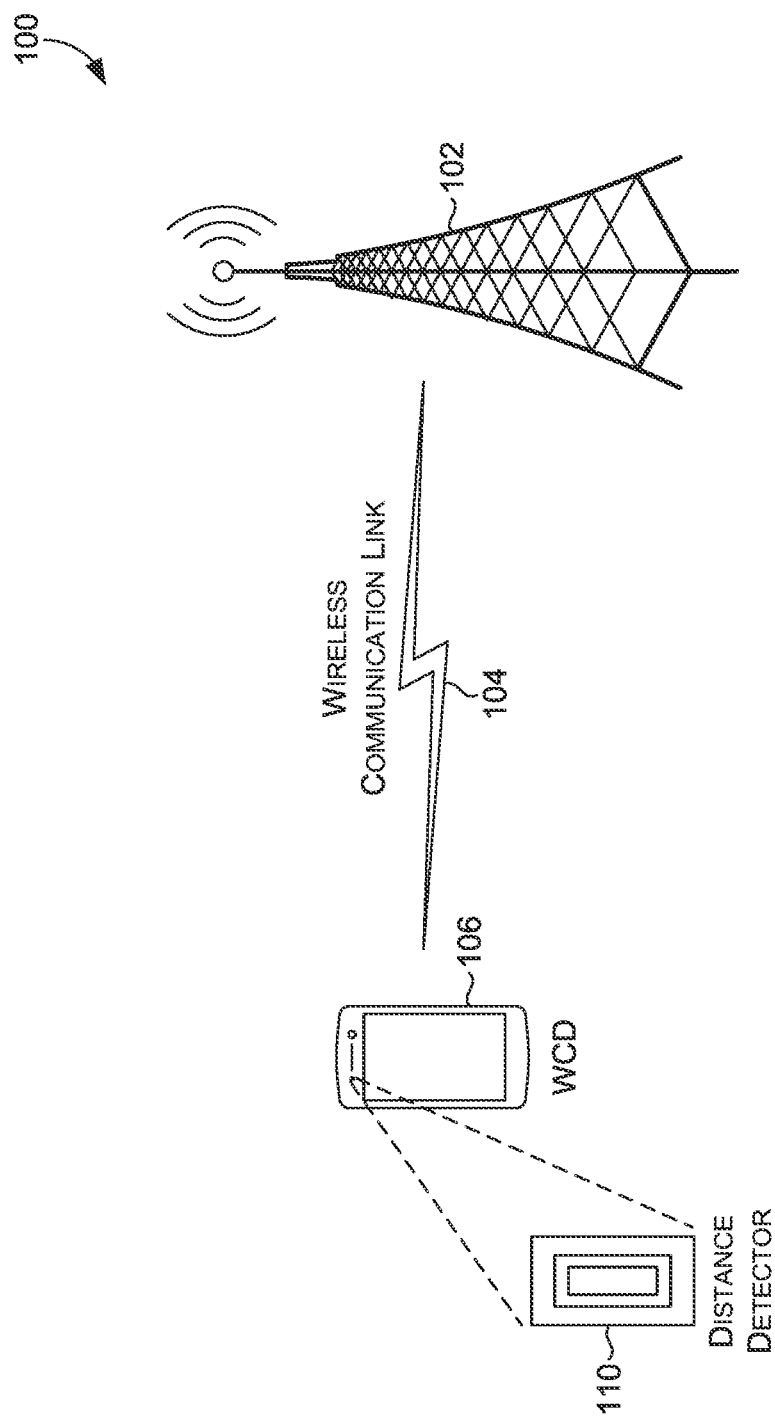
FIG. 1 depicts an example of a network environment in accordance with one or more embodiments.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GSM Global System for Mobile communications
DVD Digital Versatile Discs
EEPROM Electrically Erasable Programmable Read Only Memory
LTE Long Term Evolution
MIMO Multiple Input Multiple Output
MD Mobile Device
PC Personal Computer
PCS Personal Communications Service
PDA Personal Digital Assistant
RAM Random Access Memory
ROM Read only Memory
SINR Transmission-to-Interference-Plus-Noise Ratio
TDMA Time Division Multiple Access
WCD User Equipment
WCD Wireless Communication Device (interchangeable with UE)
GPRS General Packet Radio Service
WiMAX Worldwide Interoperability for Microwave Access
VoIP Voice Over Internet Protocol Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more WCDs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, an access point may be defined by its ability to communicate with a WCD according to a single protocol (e.g., 3G, 4G, LTE, 5G, and the like); however, in other aspects, a single access point may communicate with a WCD according to multiple protocols.

While some WCDs may have the capability of communicating in a wireless communications network using more than one transmit power, it may be difficult to determine when to use one transmit power, and when to use another. In aspects herein, the distance between the WCD and a portion of the user's body (e.g., the user's ear) is measured or otherwise determined. Once this is determined, the user device, or even a network component, can make a determination as to whether the WCD is to transmit at a lower power or a higher power. For instance, if the distance is below some predetermined threshold (e.g., 0.5 inch, 1 inch, 2 inches), the WCD may transmit at a lower power, being that the WCD is closer to the user's body. This smaller distance often indicates that the WCD is close to the user's face, even potentially in contact with the user's ear, thus indicating the use of a voice session where a lower uplink power is acceptable. Alternatively, if the distance between the WCD and the user's body is above the threshold (e.g., the user is holding the WCD away from his/her body while using speaker phone), the WCD may transmit at a higher power, as the WCD is farther away from the user's body. This greater distance may indicate that the user is in an active data session, or that the user is utilizing speakerphone or headphones where it makes sense to transmit at a higher uplink power.

In a first aspect, a system is provided for dynamically allocating total uplink power wireless communication device (WCD). The system includes a processor and one or more computer storage hardware devices storing computer-usable instructions that, when used by the processor, cause the processor to perform a method. The processor is caused to determine that a distance between a portion of a user's body and the WCD is less than a predetermined threshold, and based on the distance being less than the predetermined threshold, determine whether to transmit a wireless uplink signal at a first uplink power or a second uplink power. In aspects, the second uplink power is less than the first uplink power. The processor is also caused to transmit the wireless uplink signal at the second uplink power.

In a second aspect, a method is provided for dynamically allocating total uplink power for a wireless communication device (WCD). The method includes determining that a distance between a portion of a user's body and the WCD is less than a predetermined threshold, and based on the distance being less than the predetermined threshold, determining whether to transmit a wireless uplink signal at a first uplink power or a second uplink power. In aspects, the second uplink power is less than the first uplink power. The method also includes transmitting the wireless uplink signal at the second uplink power.

In a third aspect, a method is provided for dynamically allocating total uplink power wireless communication device (WCD). The method includes determining that a distance between a portion of a user's body and the WCD is greater than a predetermined threshold, and based on the distance being greater than the predetermined threshold, determining whether to transmit a wireless uplink signal at a first uplink power or a second uplink power. In aspects, the second uplink power is less than the first uplink power. The method also includes transmitting the wireless uplink signal at the first uplink power.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

In aspects, a distance between a portion of a user's body and a WCD 106 is determined or measured by a distance detector 110. The distance detector 110 may be or include a gyroscope, accelerometer, thermal imaging, IR light sensor, or another type of light or imaging feature or one or more of these features in combination that is capable of determining the proximity between a portion of the user's body and the WCD 106. A distance detector 110 that is separate from a processor may be further configured to relay distance information to the processor. The distance detector 110, once having determined the distance between the WCD 106 and at least a portion of the user's body then may communicate this information to a processor or another component of the WCD 106 for further processing. The WCD 106 may then determine whether the distance is greater or less than a predetermined threshold. Once this is determined, the WCD 106 communicates using either a smaller or greater uplink power.

In one aspect, the distance being less than a predetermined threshold indicates that the WCD 106 may currently be on or near the user's ear, such as if the user is making a voice call and is not using speaker phone or the like. At or near the user's ear is an adjustable distance that can be within a few or several centimeters, millimeters, inches, etc., of the user's ear or physically touching the user's ear. The decrease in wireless uplink power improves efficiency and connectivity because if the distance between the WCD 106 and the user is below the predetermined threshold, it is likely the user is only utilizing voice, and will not require as much wireless uplink power as if the user was utilizing data in addition to or alternatively to voice. Voice sessions require little bandwidth, thus they can utilize smaller carriers such as those found in low-frequency bands (e.g., 600, 700, 800 MHz, and the like), which are bands that propagate farther and require less uplink transmit power. Additionally, utilizing a lower uplink power when the WCD 106 is close to or on the user's ear may alleviate some safety concerns. Once an uplink power is determined, the WCD 106 may communicate, such as by way of wireless communications link 104, to other devices through cell site 102.

Figure 2B:
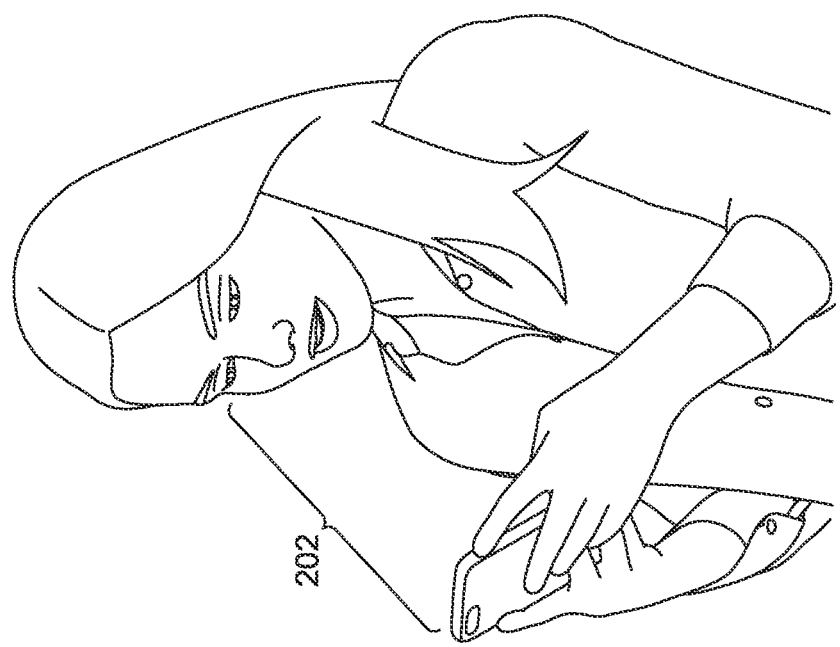
FIGS. 2A and 2B depict a representation of a user utilizing a wireless communication device in accordance with aspects herein.
Figure 2A:
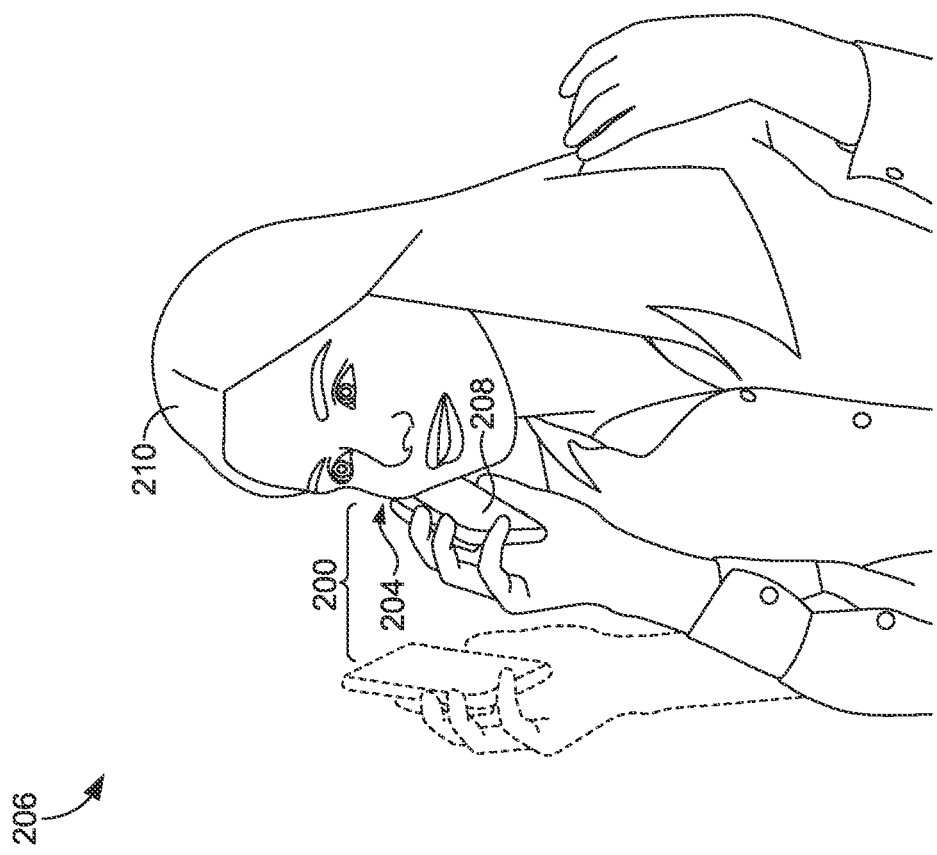

Turning now to FIG. 2A, a representation is illustrated of a user 206 with a WCD 208 near the user's head 210, and specifically near the user's ear 204 illustrated by physically touching the user's ear. In this embodiment near is depicted as touching the user's head 210 and or ear 204. While the WCD 208 is illustrated in FIG. 2A as touching the user's head 210, in other aspects, the WCD 208 may be some distance away from the user's head 210, but may still cause the WCD 208 to transmit at a lower power level. For instance, the WCD 208 may be a less than, for illustrative purposes only, 1 centimeter, 1 millimeter, or 1 inch from the user's ear 204 or physically touching the user's ear 204. For example, the WCD 208 physically touching the user's ear 204 would include when the user is utilizing voice and speaking on the WCD 208. As shown, WCD 208 may have previously been away from the user's head 210 as illustrated by a distance 200, but has been moved closer to a user's head 210 as illustrated by the WCD 208 physically touching the user's ear.

Turning now to FIG. 2B, a representation is illustrated of a user 206 with a WCD 208 located away from the user's head 210, or more specifically, the user's ear 204. In this aspect, the WCD 208 is depicted as not touching any portion of the user's head 210, as illustrated by a longer distance 202. The distance 202 between the WCD 208 and the user's ear 204 is greater than a predetermined threshold, and may be set by the network operator or some other network component or personnel. For instance, this distance could be greater than 1 inch, 3 inches, 6 inches, 12 inches, or the like. For example, the longer distance 202 being greater than the predetermined threshold may be when the user is utilizing a data session while on an application, the internet, or otherwise. As such, when it is determined that the longer distance 202 between a portion of a user's body and the WCD 208 is greater than a predetermined threshold, the WCD 208 communicates using an increased or higher uplink power. This higher wireless uplink power improves efficiency and connectivity because if the user's face, ear or head region is not close to the device, then it is likely the user is utilizing data and will require increased wireless uplink power. By responding to the changing needs of the user, the WCD 208 will have better connectivity and functionality resulting in a stronger connection and lower lag time. Additionally, with the WCD being farther away from the user's ear 204, uplink power can be increased where safety concerns are reduced. Increasing uplink power in this way provides for increased propagation characteristics and is useful to extend coverage in an area or within a population. Because mobile communications is uplink limited due to limited uplink power and small form factor of mobile devices, increasing the mobile transmission power is the logical way to extend coverage.

In another aspect, a voice session may be ongoing but the distance 202 between the WCD 208 and the user's head 210 is greater than a predetermined threshold. This may occur when the user is utilizing headphones or when the user is speaking on speakerphone or otherwise utilizing the WCD 208 when it is unnecessary for the WCD 208 to be close to the user's ear 204.

Figure 3:
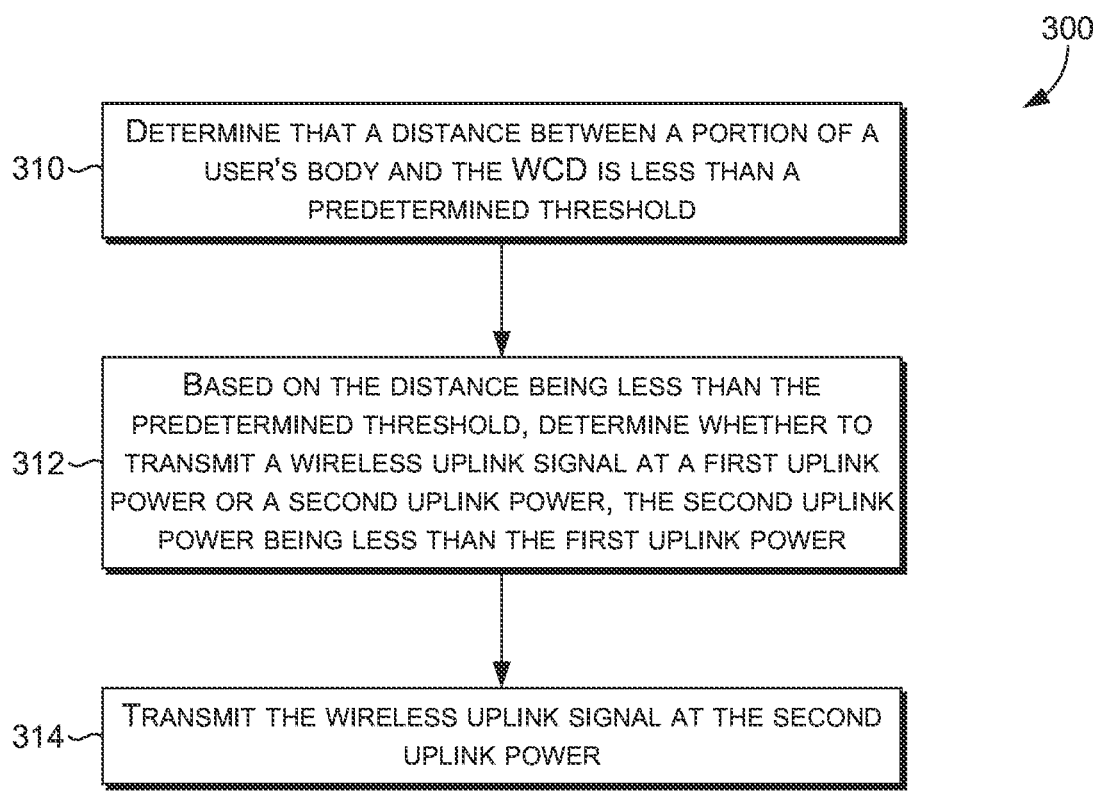
FIGS. 3-4 each depict a flow diagram of an exemplary method for uplink channel power management by a wireless communication network, in accordance with aspects herein.

FIG. 3 depicts a flow diagram of an exemplary method 300 for dynamically allocating total uplink power for a WCD, in accordance with implementations of the present disclosure. Initially, at block 310, the method compriseses determining that a distance between a portion of a user's body and the WCD is less than a predetermined threshold. As mentioned herein, the predetermined threshold is adjustable by the network (e.g., network operator). Therefore, the threshold could be 1 mm, 1 cm, 1 inch, 2 inches, etc. In aspects, a distance measurement is made by the WCD or some component of the WCD, such as the distance detector 110 shown in FIG. 1. This distance measurement may be sent to another component of the WCD or even to a network component. In an aspect, when the distance is less than the predetermined threshold, this may indicate that the WCD is not at or near the user's ear. At block 312, based on the distance being less than the predetermined threshold, it is determined whether to transmit a wireless uplink signal at a first uplink power or a second uplink power, where the second uplink power being less than the first uplink power. At block 314, the wireless uplink signal is transmitted at the second uplink power, based on the distance being less than the predetermined threshold. In an aspect, the second uplink power is less than 26 dBm. For exemplary purposes only, the uplink frequency associated with the wireless uplink signal may be 600 MHz and other bands are contemplated to be within the scope of this application. In another aspect, the second uplink power is at or about 23 dBm and the first uplink power is at or about 26 dBm. In one aspect, the wireless uplink signal is a voice signal.

Figure 4:
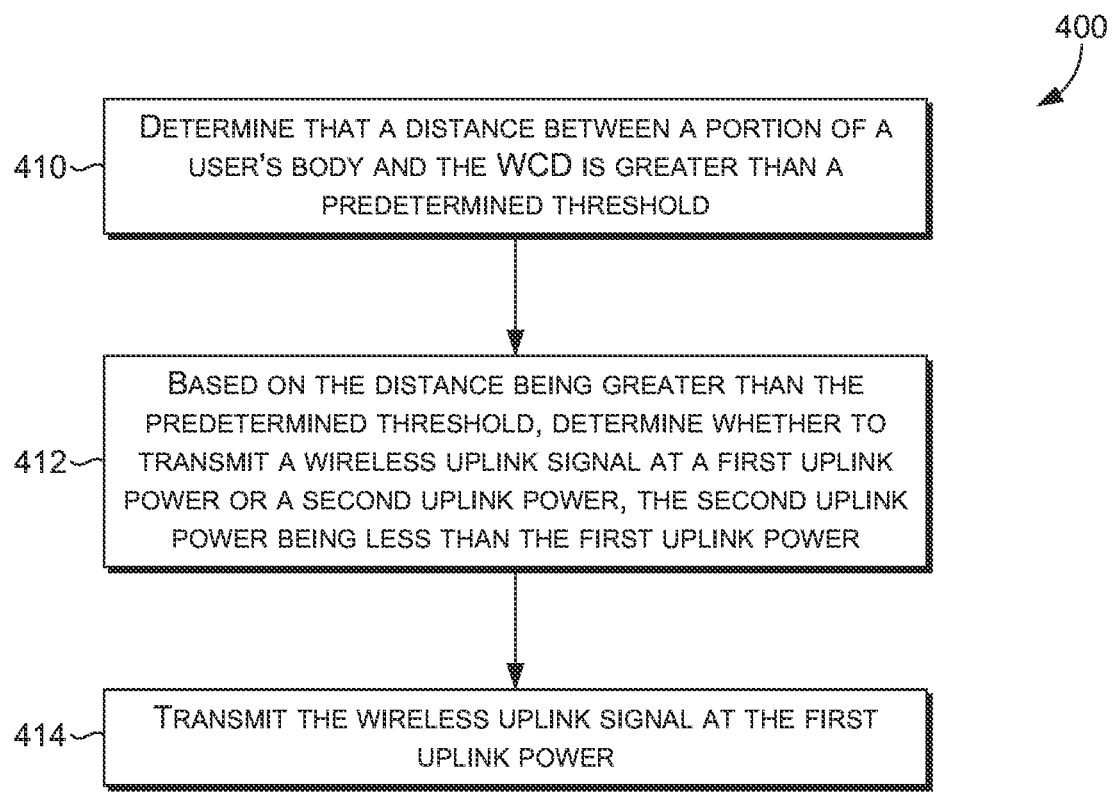

FIG. 4 depicts a flow diagram of an exemplary method 400 for dynamically allocating total uplink power for a WCD, in accordance with implementations of the present disclosure. Initially at block 410, it is determined that a distance between a portion of a user's body and the WCD is greater than a predetermined threshold. In aspects, a distance measurement is made by the WCD or some component of the WCD, such as the distance detector 110 shown in FIG. 1. This distance measurement may be sent to another component of the WCD or even to a network component. In an aspect, when the distance is less than the predetermined threshold, this may indicate that the WCD is not at or near the user's ear. At block 412, based on the distance being greater than the predetermined threshold, a determination is made whether to transmit a wireless uplink signal at a first uplink power or a second uplink power, where the second uplink power is less than the first uplink power. In one aspect, the wireless signal is a data signal. Because in some aspects the user is utilizing data, 26 dBm is more beneficial to carry this higher speed data. At block 414, the wireless uplink signal is transmitted at the first uplink power.

Figure 5:
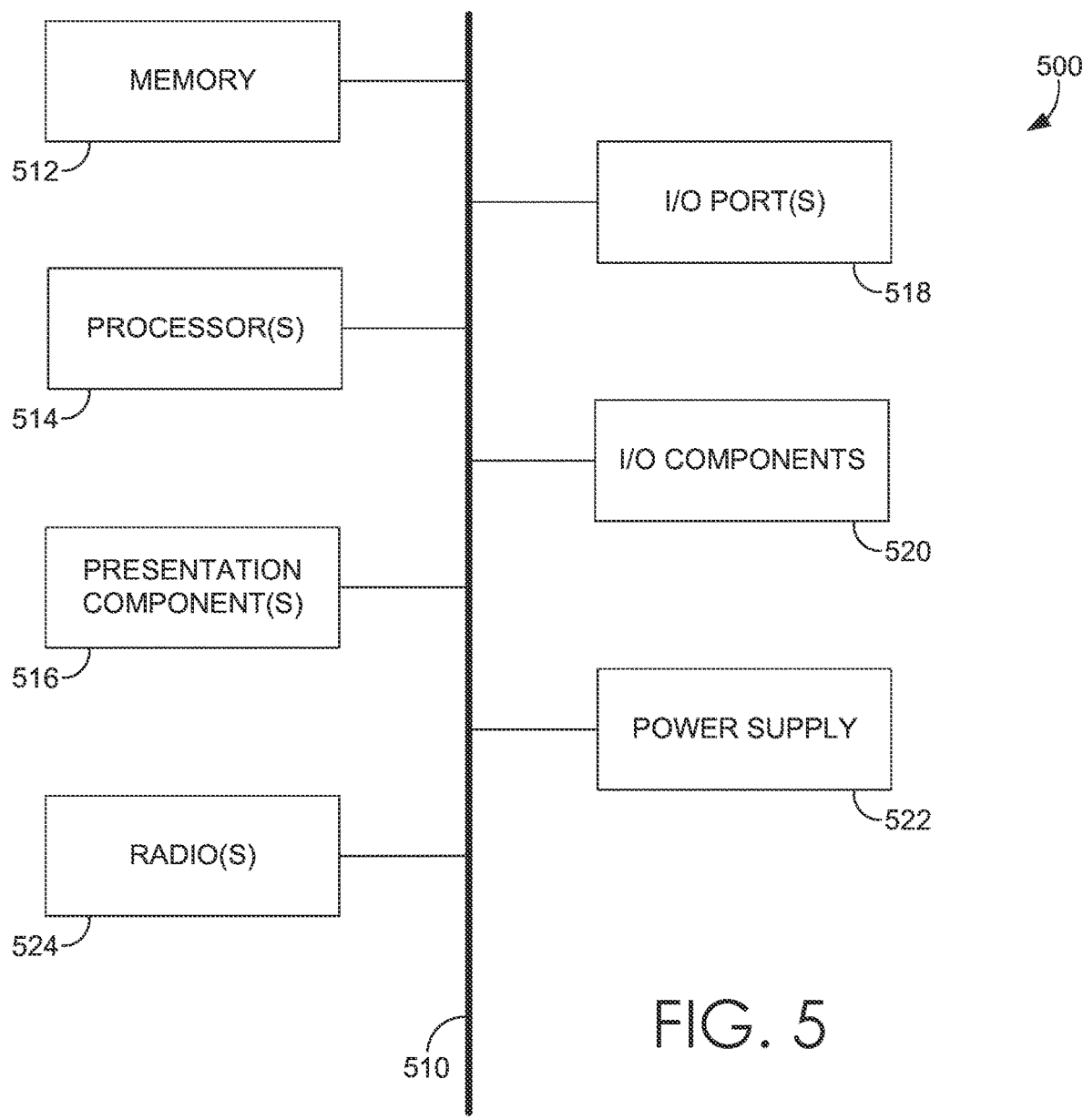
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 810, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks DVD or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications cell site, or even access points (as well as other components) can provide wireless connectivity in some embodiments.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A system for dynamically allocating total uplink power for a wireless communication device (WCD), the system comprising:
   a processor;
   one or more computer storage hardware devices storing computer-usable instructions that, when used by the processor, cause the processor to:
   determine a distance between a portion of a user's body and the WCD;
   based on a determination that the distance is less than a predetermined threshold and a determination that the WCD is engaged in a voice session, transmit a wireless uplink signal with a first maximum uplink power and on a frequency in a range of 600-800 MHz; and
   based on a determination that the distance is greater than the predetermined threshold, transmit the wireless uplink signal with a second maximum uplink power, wherein the second maximum uplink power is greater than the first maximum uplink power.

2. The system of claim 1, wherein the distance being less than the predetermined threshold indicates that the WCD is in contact with a portion of the user's head.

3. The system of claim 1, wherein the portion of the user's body is the user's ear.

4. The method of claim 1, wherein the first maximum uplink power is 23 dBm.

5. The method of claim 1, wherein the second maximum uplink power is 26 dBm.

6. A method for dynamically allocating total uplink power for a wireless communication device (WCD), the method comprising:
   determining that a distance between a portion of a user's body and the WCD is less than a predetermined threshold;
   based on a determination that the distance is less than a predetermined threshold and a determination that the WCD is engaged in a voice session, transmit a wireless uplink signal with a first maximum uplink power and on a frequency in a range of 600-800 MHz; and
   based on a determination that the distance is greater than the predetermined threshold, transmitting the wireless uplink signal with a second maximum uplink power, wherein the second maximum uplink power is greater than the first maximum uplink power.

7. The method of claim 6, wherein determining the distance between the portion of the user's body and the WCD further comprises receiving a distance indication from the WCD.

8. The method of claim 6, wherein when the distance is less than the predetermined threshold, the WCD is at or near a user's ear.

9. The method of claim 6, wherein the second maximum uplink power is 26 dBm.

10. The method of claim 6, wherein the first maximum uplink power is 23 dBm.

11. The method of claim 10, wherein determining the distance between the portion of the user's body and the WCD further comprises receiving a distance indication from the WCD.

12. A method for dynamically allocating total uplink power for a wireless communication device (WCD), the method comprising:
   determining that a distance between a portion of a user's body and the WCD is greater than a predetermined threshold;
   based on a determination that the distance is less than the predetermined threshold and a determination that the WCD is engaged in a voice session, transmit a wireless uplink signal with a first maximum uplink power and on a frequency in a range of 600-800 MHz; and
   based on a determination that the distance is greater than the predetermined threshold, transmitting the wireless uplink signal with a second maximum uplink power, wherein the second maximum uplink power is greater than the first maximum uplink power.

13. The method of claim 12, wherein when the distance is greater than the predetermined threshold, the WCD is not at or near a user's ear.

14. The method of claim 12, wherein the first maximum uplink power is 23 dBm.

15. The method of claim 12, wherein the second maximum uplink power is 26 dBm.

16. The method of claim 12, wherein the wireless uplink signal is a data signal.

* * * * *